Figure 1:
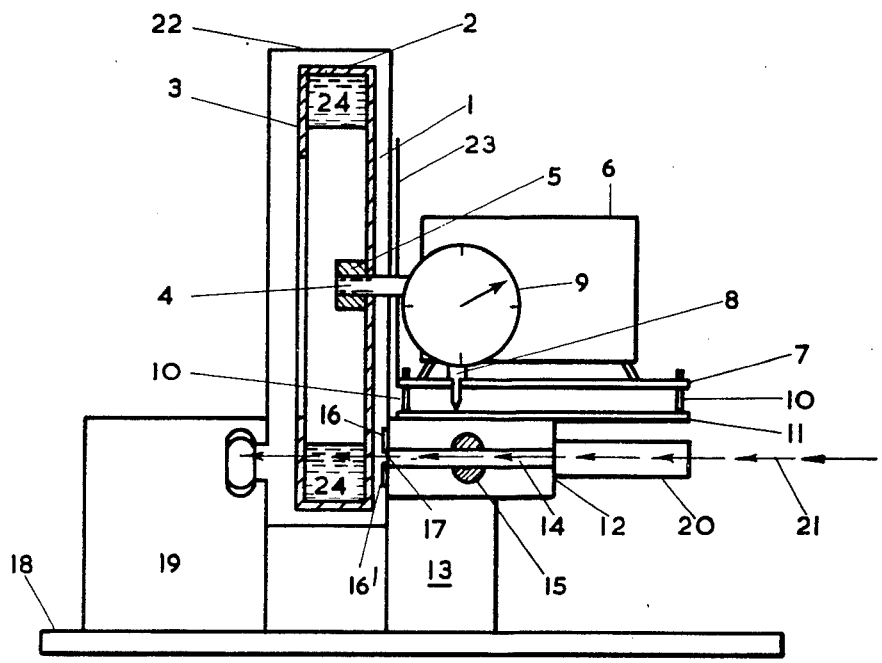

United States Patent [19]
Hornby et al.

[11] 3,914,604
[45] Oct. 21, 1975

[54] MEASUREMENT OF ABSORPTION OF RADIATION

[75] Inventors: Michael Robert Hornby, Stockton-on-Tees; David Frank Tunstall, Redcar, both of England

[73] Assignee: British Titan Limited, Billingham, Teaside, England

[22] Filed: Apr. 20, 1973

[21] Appl. No.: 353,198

[30] Foreign Application Priority Data
May 20, 1972 United Kingdom................ 23850/72
May 20, 1972 United Kingdom................ 23849/72

[52] U.S. Cl. ................ 250/272; 250/273; 250/277; 250/373
[51] Int. Cl. ................................................ G01t 1/16
[58] Field of Search ........... 250/306, 308, 272, 273, 250/274, 277, 373; 356/102

[56] References Cited
UNITED STATES PATENTS
3,009,388  11/1961  Polanyi................................ 73/61.4
3,449,567  6/1969  Olivier................................ 250/362
3,588,504  6/1971  Laundy.............................. 250/308

Primary Examiner—James W. Lawrence
Assistant Examiner—C. E. Church
Attorney, Agent, or Firm—Schuyler, Birch, Swindler, McKie & Beckett

[57] ABSTRACT

A method for the determination of particle size distribution in which a beam of electromagnetic radiation is passed through a liquid containing the powder whilst it settles due to the action of centrifugal force with the beam having a thickness in a radial direction $d$ such that $d/r$ is not greater than 0.2 and in which $r$ is the depth of the beam from the liquid surface and where $r/R$ is not greater than 0.1 where R is the radius of the inner surface of the liquid.

Apparatus for use in the determination of particle size distribution as described comprising a disc centrifuge having an annular chamber to retain the powder dispersion under test, a source of electromagnetic radiation, means to define a beam of the radiation, detector means and means to move the disc relative to the beam.

26 Claims, 2 Drawing Figures

U.S. Patent  Oct. 21, 1975  3,914,604

MEASUREMENT OF ABSORPTION OF RADIATION

This invention relates to a method and apparatus for measurement and particularly to a method and apparatus for the measurement of the absorption of scattering of electromagnetic radiation on passage through a liquid medium containing a powder.

According to the invention a method of measurement of the absorption or the scattering of electromagnetic radiation comprises passing a beam of electromagnetic radiation through a liquid containing a dispersed powder material retained within an annular chamber at the periphery of a disc-like member during rotation of the disc-like member, said beam having a thickness $d$ in a radial direction where $d/r$ is not greater than 0.2 in which $r$ is the radial depth of the beam in the liquid from the radial inner surface thereof and where $r/R$ is not greater than 0.1 where R is the radius from the centre of the disc-like member to the radial inner surface of the liquid and measuring the amount of absorption or scattering of the radiation as the powder settles during rotation.

According to the present invention also a method of measurement of the absorption or scattering of electromagnetic radiation comprises placing a known volume of a liquid within an annular chamber at the periphery of a rotatably mounted disc-like member, rotating the disc-like member, passing a beam of electromagnetic radiation in a direction substantially at right angles to the plane of the disc-like member through the liquid with the beam having a thickness $d$ in a radial direction where $d/r$ is not greater than 0.2 in which $r$ is the radial depth of the beam in the liquid from the radial inner surface thereof and where $r/R$ is not greater than 0.1 in which R is the radius from the centre of the disc-like member to the radial inner surface of the liquid and measuring the absorption or scattering of the beam, measuring the absorption or scattering of the electromagnetic radiation by an equal volume of a dispersion of the liquid containing a powder material to be tested while rotating said disc while the powder settles in the liquid due to centrifugal force and ceasing the measurement when the absorption or scattering has a value substantially equal to that of the liquid when free of powder.

According to the present invention also apparatus suitable for use in the measurement of the intensity of electromagnetic radiation comprises a disc-like member mounted to be rotatable about an axis passing through its centre and at right angles to the plane of the disc, said disc having an outer peripheral circumferential wall provided with an annular member depending inwardly of the circumferential wall to form a chamber suitable for the retention of a liquid medium, with the said disc-like member and said annular member being formed of a material substantially transparent to electromagnetic radiation, means to rotate the disc-like member about said axis, confining means to define a beam of electromagnetic radiation mounted externally of said chamber such that the beam is at right angles to a radius and to the plane of said disc, means to effect radial displacement between the centre of said disc and said confining means and means to measure the absorption or scattering of a beam of electromagnetic radiation mounted to be in line with said confining means and on the opposite side of said chamber.

The method of the present invention is particularly suitable for measuring the absorption or scattering of radiation of powder dispersions to enable the particle size distribution to be obtained.

This distribution is of interest in many fields of powder technology such as in relation to inorganic pigments e.g. titanium dioxide, alumina, chromic oxide, iron pigments, clay and zinc oxide. The particle size distribution often determines important properties of the particular powder and can provide an important control procedure for a manufacturing operation.

The method of the present invention does not require the use of chemical analysis and permits an accurate result of the Stokes diameter to be obtained. In essence the method is simple and relies on the measurements of the change in intensity indicating the absorption or scattering of a beam of electromagnetic radiation as the particles of powder settle in a liquid dispersion. By a knowledge of the intensity of the radiation on passage through the powder-free liquid and of the intensity on passage through the dispersion prior to settling it is possible to determine the particle size distribution of the powder.

It can be shown for a particle sedimenting radially in a spinning disc that $$\frac{dX}{dT} = \frac{(s-f)}{18n} D^2 W^2 X$$

where X is the distance of the particle from the centre of rotation at time T, $s$ is the density of the particle, $f$ is the density of the fluid, D is the diameter of the particle, W is the angular velocity of the particle and n is the viscosity of the fluid.

Several methods for the solution of the equation have been proposed but all involve some degree of approximation or give poor accuracy when used practically.

However, when sedimentation distances are small compared to the radius of the disc the difficulties caused by concentration changes due to radial motion and by the increasing force with distance from the axis of revolution become unimportant. This has the advantage that the error can be reduced experimentally to any acceptable level and an exact solution for the settling equation can easily be obtained.

The method of the invention requires the use of a device which covers a very small fraction of the radius of the disc-like member to measure the concentration at a fixed level in the liquid dispersion. The level of measuring or depth below the surface $r$ should be small compared to the radius R of the inner surface of the liquid so that $r/R$ is not greater than 0.1 and preferably $r/R$ is not greater than 0.025. Under these conditions it can be shown that $$D^2 = \frac{6.299 \times 10^9 \, n \, \log \frac{(r+R)}{R}}{N^2 \, (s-f) \, T} \quad \text{(Equation C)}$$

where N is the speed of the disc in revolutions per minute, and T is the time during which settling has been taking place. The units of the equation are minutes, poise, and microns and logarithms to base 10 are used. Normally $r$ is the distance from the surface to the centre of the beam but since the beam is so narrow it may, for practical purposes denote the distance to the nearest edge of the beam.

In carrying out the method of the invention it is necessary for the beam of electromagnetic radiation to have a radial depth $d$ which is governed by the relationship $d/r$ is not greater than 0.2 usually not greater than 0.1 and preferably not greater than 0.025.

Basically the apparatus of the invention is a disc centrifuge which includes a disc-like member having an outer peripheral chamber to contain the liquid dispersion.

The disc is mounted to be rotatable in the plane of the disc about its centre and has at its outer periphery a circumferential wall at right angles to the plane of the disc which has a radially inwardly turned lip or annulus to define a peripheral chamber. Usually the disc wall and annulus are formed of similar material but at least the disc and the annulus must be formed of a material that is substantially transparent to the particular form of electromagnetic radiation to be used. Usually the disc-like member will be mounted with its plane substantially vertical but it may be at any other desired angle, for instance, horizontal.

By the term "substantially transparent" there is usually meant that the material does not itself absorb above 50% of the particular form of radiation to be used. The degree of absorption permitted by the material naturally depends on the original intensity of the beam of radiation prior to passage through the chamber when containing a liquid medium to be tested. For instance, if a beam of electromagnetic radiation is to be used having a very high intensity it may be possible to permit the walls of the chamber to absorb even up to 90% or higher of the radiation intensity prior to passage through the chamber.

Typical materials that are suitable for use as the disc and annular wall are polymers such as cellulose acetate (Perspex), polyethylene, transparent polyvinyl chloride, polyamide, polyethylene terephthalate and other thermo-setting or thermoplastic polymers. Naturally the circumferential wall need not necessarily be formed of material that is substantially transparent to the electromagnetic radiation but for convenience it is often preferable to use the same materials of construction for the disc, wall and annulus.

The disc, wall and annulus may be an integral structure or may be assembled from separate constituent parts. Naturally the disc, wall and annulus should be of sufficient strength to resist deformation or collapse when the disc is rotated at the desired speed.

The disc usually is mounted on a shaft driven by suitable means either through an appropriate gear train or the shaft can be driven directly. Preferably the shaft is directly driven by an electric motor in order that vibrations are not induced in the apparatus by the use of a gear train. Preferably the motor should be one which is able to maintain a substantially constant speed at the chosen speed to avoid fluctuations which can affect the results obtained. Generally the disc-like member is rotated at a speed of from 500 to 2000 revolutions per minute but more usually from 750 to 1500 revolutions per minute. However the particular chosen speed depends on the size of the disc and on the type of powder material.

The apparatus of the invention includes confining means to define or produce the beam of electromagnetic radiation. Such means includes for example a slit formed in any suitable manner such as in a plate member or between two plates at least one of which is adjustable to narrow or widen the beam of radiation produced. The confining means is so positioned as to produce a beam of radiation at right angles to a radius of the disc and to the plane of the disc.

Means are provided to relatively displace the confining means and the disc in a radial direction and either the confining means may be mounted on a moveable support or preferably, the disc is mounted to be moveable in relation to the confining means. Preferably the whole disc, shaft and motor assembly are mounted to be moveable in relation to the confining means, for instance, the assembly can be mounted on a table moveable in relation to the confining means.

Preferably the device includes measuring means to quantify the amount of relative movement between the confining means and the disc and it is also desirable to calibrate the measuring means so that when a known volume of liquid is retained within the peripheral chamber and the disc is rotated, the measuring means indicates the position of the beam in relation to the inner circumferential surface of the liquid medium. Usually the amount of relative movement between the disc and the confining means will be such as to allow radial movement from a position radially inwardly of the inner surface of the liquid medium to a point between the surface and the circumference of the disc-like member.

The apparatus of the present invention may be used with any suitable source of electromagnetic radiation which is suitable for the desired use of the apparatus. For instance the source may be a source of X-rays such as a conventional X-ray tube. The apparatus is particularly suitable for use with existing sources of X-rays which are often used in the control laboratories for manufacturing processes or in research or development laboratories. Other types of suitable sources of radiation are radioactive isotopes producing a variety of different types of radiation. Typically such sources include radioactive isotopes of cobalt, caesium, indium, thulium and cadmium.

The electromagnetic radiation usually will have a wave length of up to 1000 A, and preferably 0.2 A to 6 A. The type of electromagnetic radiation usually depends to some extent on the type of use to which the apparatus is to be put, for instance, on the constitution of the powder in a suspension which is to be tested.

A collimator to produce a beam of parallel electromagnetic radiation will usually be positioned between the source and the confining means. The collimator can be included in the apparatus of the present invention or can be separate therefrom if desired. In addition, a shutter may be mounted between the confining means and the collimator if desired, as a safety device to close off the beam of electromagnetic radiation when the apparatus is not being used.

The size of the disc-like member may vary over wide limits and usually the radial depth of the annular member is chosen to be sufficient to retain the desired volume of liquid medium within the peripheral chamber when the disc-like member is at rest. Usually it is not necessary for the annular member to have a radial depth greater than half the radius of the disc-like member.

The apparatus includes means to measure the absorption or scattering of the beam radiation after it has passed through the peripheral chamber. The means to effect this measurement may be a conventional detector and amplifier to detect the intensity of the electromagnetic radiation and the means is mounted to be in line with the confining means and on the opposite side of the peripheral chamber. The means to effect the measurement can be coupled to a counter to display visually a numerical value of the intensity at chosen times or may produce a graph of the intensity of the radiation against time.

The method of the invention is particularly suitable for use in the measurement of the particle size distribution of titanium dioxide pigments in which the pigment is used in the form of an aqueous slurry. Generally the slurry will contain from 20 to 50 grams per litre of the titanium dioxide pigment although concentrations outside this range can be used, if desired. Preferably the concentration is from 20 to 30 grams of $TiO_2$ per litre of slurry. A convenient source of the slurry is that obtained after wet milling of the pigment and appropriate dilution may be effected, if desired.

Figure 2:
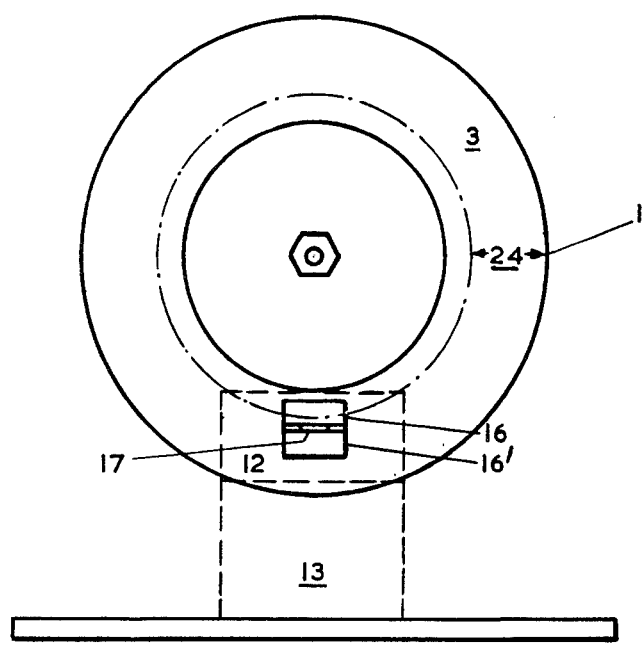

One form of apparatus for carrying out the method of the invention and its use will now be described by way of example only and with reference to the accompanying drawings in which:

FIG. 1 shows a diagrammatic side elevation of the apparatus with part in section, and FIG. 2 shows a diagrammatic front elevation of the apparatus.

The apparatus includes a disc-like member 1 having a peripheral circumferential wall 2 and annular wall 3 formed of a cellulose acetate polymer. The disc is mounted on a drive shaft 4 by means of a locknut 5. The shaft 4 is driven directly by an electric motor 6.

The electric motor 6 is mounted on a table 7 and is provided with a height adjusting device 8 and indicator 9. The table 7 is mounted on guide pins 10 of the table base plate 11 which is carried on supporting members 12 and 13.

Member 12 has a passageway 14 provided with a shutter 15 to close the passageway 14 and supports two moveable members 16 and 16' which define a slit 17. Mounted on a supporting base 18 opposite the slit 17 is a detector 19 and amplifier for X-rays.

The member 12 also carries a collimator 20 to render parallel a beam 21 of X-rays from a suitable source (not shown).

Shielding member 22 and 23 are provided around the disc-like member 1 assembly.

FIG. 2 shows a front elevation with many parts omitted to illustrate clearly the position of the slit 17.

One manner of using the described apparatus will now be described by way of Example only.

One hundred $cm^3$ of water are introduced into the chamber formed by the disc-like member 1, peripheral wall 2 and annular wall 3. The surface radius of the disc-like member is 9.45 cm. The motor 6 is started and when the operating speed has been reached, i.e. 1,010 revolutions per minute, the beam of X-rays having a wavelength of 1.54 A is switched on. The slit 17 has a width of 0.05 mm. The detector 19 is also switched on and this is coupled to a counter and to a chart recorder to produce a continuous record of the intensity throughout the experiment.

By raising or lowering the disc with respect to the beam the position is found where the count is exactly midway between that through air and that completely through the water. This position is that of the surface of the liquid. The disc is then raised through 2 mm. so that the beam is 2.0 mm. below the surface of the liquid.

The disc is then stopped, emptied and dried and 100 $cm^3$ of a milled aqueous suspension of titanium dioxide pigment at a concentration of 25 grams per litre are added. It is important that the volume of suspension is the same as the original volume of water used.

After the addition of the aqueous suspension the intensity of the radiation through the dispersed suspension is measured immediately after its addition to the disc-like member and then the motor is switched on and intensity is measured and recorded during the sedimentation process. The operation is completed when the count rate has increased to the same value as that obtained using pure water. The disc is then stopped, emptied and cleaned.

After the sedimentation is complete the X-ray intensities are measured from the recorder chart at the required time intervals and assigned equivalent count values by reference to the electronic counter measurements at known times.

It can be shown that $$\log I = k_1 - k_2 C \quad \text{(Equation A)}$$

where $I$ is the intensity of the beam after passing through the suspension usually expressed as counts per second, $k_1$ and $k_2$ are constants for the particular experiment and $C$ is the concentration of the powder material in the suspension but usually is taken as the fractional concentration of the original concentration. Logarithms to base 10 are used.

If $I_w$ is the intensity of the beam through the water free of powder material and $I_s$ is the initial intensity through the suspension then from (A)

$\log I_w = k_1$ $\log I_w - \log I_s = k_2$ using $C = 1$ at $I = I_s$ and $C = 0$ at $I = I_w$.

At any time T the value of the concentration ($C_T$) is given by $$\frac{K_1 - \log I_T}{K_2} = C_T \quad \text{(Equation B)}$$

where $I_T$ is the intensity of the beam at time T.

From the measurements made the values of $I_T$ and T are known and from (B) the appropriate values of $C_T$ can be determined.

From the equation given hereinbefore relating $D^2$ and T the values of $D_T$ are calculated where $D_T$ is the diameter at time T. Conveniently equation C reduced to $$D = K T^-$$

where $K$ is a constant for a particular experiment.

Usually the results are expressed as the percentage of the powdered material being tested having a size greater than that measured at time $T$ i.e.

$$\text{percentage oversize} = (1 - C_T) \times 100\%$$

and this can conveniently be shown by plotting $D_T$ against $(1 - C_T) \times 100$. Alternatively, the results can be shown by plotting $D_T$ against $C_T$.

In order to calculate the particular particle diameter it is required to know various densities and viscosity and since these are temperature dependent the appropriate value should be inserted in the equation for the particular temperature of operation.

The results may conveniently be calculated using an appropriately programmed computer or desk calculator.

The method of the present invention is quick and produces a result to a desired degree of accuracy.

Taking a particular Example a suspension of titanium dioxide pigment was examined using the method herein described. The apparatus had a size such as $R = 9.450$ cm and $r = 0.208$ cm. The values of the other variables were $d = 0.05$ mm
$n = 0.0103$ poise (temperature $= 19°C$)
$s-f = 3.26$
$N = 1010$ r.p.m.

Hence
$K = 0.1891$ and $D = 0.1891\ T^-$

Also it was found that
$I_w = 26400$ counts per second
$I_s = 17550$ counts per second Hence
$k_1 = 4.4216$ and $k_2 = 0.1773$.

The values of $I_T$ at times $T$ and the results of the calculations are shown in the following Table.

TABLE

| T (mins) | $I_T$ | $D_T = K\ T^-$ (microns) | log $I_T$ | $k_1 - $ log $I_T$ | $\dfrac{k_1 - \text{log } I_T = C_T}{k_2}$ | $(1 - C_T)\ 100 =$ Percent greater than $D_T$ (%) |
|---|---|---|---|---|---|---|
| 0 | 17550 | | | | | |
| 0.25 | 17550 | 0.870 | 4.2443 | 0.1773 | 1.0000 | 0.00 |
| 0.50 | 17550 | 0.615 | 4.2443 | 0.1773 | 1.0000 | 0.00 |
| 0.75 | 17570 | 0.502 | 4.2447 | 0.1769 | 0.9977 | 0.23 |
| 1.00 | 17710 | 0.434 | 4.2482 | 0.1734 | 0.9780 | 2.20 |
| 1.50 | 18260 | 0.355 | 4.2615 | 0.1601 | 0.9030 | 9.70 |
| 2.00 | 18920 | 0.307 | 4.2769 | 0.1447 | 0.8161 | 18.39 |
| 3.00 | 20790 | 0.251 | 4.3179 | 0.1037 | 0.5849 | 41.51 |
| 4.00 | 22600 | 0.217 | 4.3541 | 0.0675 | 0.3807 | 61.93 |
| 5.00 | 24410 | 0.195 | 4.3876 | 0.0340 | 0.1918 | 80.82 |
| 8.00 | 25890 | 0.154 | 4.4132 | 0.0084 | 0.0474 | 95.26 |
| 12.00 | 26310 | 0.126 | 4.4201 | 0.0015 | 0.0085 | 99.15 |
| 20.00 | 26400 | 0.097 | 4.4216 | 0.0000 | 0.0000 | 100.00 |

What is claimed is:

1. A method of measuring the absorption or scattering effect of particles precipitating in a liquid rotating in a centrifuge on a beam of electromagnetic radiation comprising passing a beam of electromagnetic radiation of wave length up to 1000A through a liquid containing dispersed particles retained within an annular chamber at the periphery of a disc-like member during rotation of the disc-like member, substantially at right angles to the plane of said disc-like member, said beam having a thickness $d$ in a radial direction where $d/r$ is not greater than 0.2 and in which $r$ is the radial depth of the beam in the liquid from the radial inner surface thereof and where $r/R$ is not greater than 0.1 where $R$ is the radius from the centre of the disc-like member to the radial inner surface of the liquid and measuring the amount of absorption or scattering of the radiation as the particles settle during rotation.

2. A method according to claim 1 in which the value of $r/R$ is not greater than 0.025.

3. A method according to claim 1 in which the value of $d/r$ is not greater than 0.1.

4. A method according to claim 3 in which the value of $d/r$ is not greater than 0.025.

5. A method according to claim 1 in which the particles are particles of powder material.

6. A method according to claim 5 in which the powder material is pigmentary titanium dioxide.

7. A method according to claim 6 in which the amount of titanium dioxide dispersed within the liquid is from 20 to 50 grams of titanium dioxide per litre of dispersion.

8. A method according to claim 7 in which the amount of titanium dioxide in the dispersion is from 20 to 30 grams of titanium dioxide per litre of dispersion.

9. A method according to claim 1 in which the electromagnetic radiation has a wave-length of from 0.2A to 6A.

10. A method according to claim 9 in which the electromagnetic radiation is X-rays.

11. A method according to claim 1 in which the disc-like member is rotated at a speed of from 500 to 2,000 revolutions per minute.

12. A method according to claim 11 in which the speed is from 750 to 1,500 revolutions per minute.

13. Apparatus suitable for use in the measurement of the intensity of electromagnetic radiation comprising a disc-like member mounted to be rotatable about an axis passing through its centre and at right angles to the plane of the disc, said disc having an outer peripheral circumferential wall provided with an annular member depending inwardly of the circumferential wall to form a chamber suitable for the retention of a liquid medium, with said disc-like member and said annular member being formed by a material substantially transparent to a beam of electromagnetic radiation having a wave length up to 1000A, means to rotate the disc-like member about said axis, means providing a source of electromagnetic radiation having a wave length up to 1000A, confining means to define a beam of said electromagnetic radiation, said confining means mounted externally of said chamber such that the beam is at right angles to a radius and to the plane of said disc, and such that said beam is of thickness $d$ in a radial direction where $d/r$ is not greater than 0.2 in which $r$ is the radial depth of the beam in said liquid medium from the radial inner surface thereof and where $r/R$ is not greater than 0.1 in which $R$ is the radius from the centre of said disc-like member to the radial inner surface of said liquid medium, means to effect radial displacement between the centre of said disc and said confining means and means to measure the absorption or scattering of a beam of electromagnetic radiation mounted to be in line with said confining means and on the opposite side of said chamber.

14. Apparatus according to claim 13 in which a collimator is provided between the source of electromagnetic radiation and the confining means to produce a beam of parallel electromagnetic radiation.

15. Apparatus according to claim 13 in which the source of electromagnetic radiation is a source of X-rays.

16. Apparatus according to claim 13 in which the disc-like member is mounted with its plane substantially vertical.

17. Apparatus according to claim 13 in which the disc-like member and said annular member are formed of a material which does not absorb above 50% of the electromagnetic radiation of said beam.

18. Apparatus according to claim 13 in which the confining means to define the beam of electromagnetic radiation includes a slit formed between two plates adjustable in relation to one another to narrow or widen the beam.

19. Apparatus according to claim 18 including means to quantify the amount of movement between the confining means and the disc.

20. Apparatus according to claim 13 in which the disc-like member is mounted to be radially moveable in relation to the confining means.

21. Apparatus according to claim 13 in which the source is a radioactive isotope.

22. Apparatus according to claim 13 in which the source of electromagnetic radiation is a radio-active isotope selected from the group consisting of cobalt, cesium, indium, thulium and cadmium.

23. A method of measuring the Stokes diameter and particle size distribution of particles comprising placing a known volume of a liquid within an annular chamber at the periphery of a rotatably mounted disc-like member, rotating the disc-like member, passing a beam of electromagnetic radiation of wave length up to 1000A in a direction substantially at right angles to the plane of the disc-like member through the liquid said beam having a thickness $d$ in a radial direction where $d/r$ is not greater than 0.2 in which $r$ is the radial depth of the beam in the liquid from the radial inner surface thereof and where $r/R$ is not greater than 0.1 in which R is the radius from the centre of the disc-like member to the radial inner surface of the liquid and measuring the absorption or scattering of the beam, measuring the absorption or scattering of the electromagnetic radiation by an equal volume of a dispersion of the liquid containing dispersed particles of the material to be tested while rotating said disc-like member while the particles settle in the liquid due to centrifugal force and ceasing the measurement when the absorption or scattering has a value substantially equal to that of the liquid when free of particles, recording the intensity of the beam of radiation after passing through the liquid containing said dispersed particles during sedimentation, and determining the Stokes diameter and particle size distribution of the particles.

24. A method according to claim 23 in which prior to measuring the absorption or scattering of the electromagnetic radiation of the dispersion of the liquid containing a powder material while rotating the disc-like member, the absorption or scattering is measured with the disc-like member stationary and prior to any substantial settlement of the powder taking place.

25. A method according to claim 23 in which the particles are particles of powder material.

26. A method according to claim 25 in which the particles are particles of pigmentary titanium dioxide.

* * * * *